No. 653,810. Patented July 17, 1900.
E. KENDALL.
STEAM BOILER.
(Application filed Apr. 24, 1900.)
(No Model.) 3 Sheets—Sheet 1.

Witnesses:
Walter E. Lombard
J. Houston Stevenson

Inventor:
Edward Kendall,
by N. C. Lombard
Atty.

No. 653,810. Patented July 17, 1900.
E. KENDALL.
STEAM BOILER.
(Application filed Apr. 24, 1900.)
(No Model.) 3 Sheets—Sheet 3.

Witnesses:
Walter E. Lombard
J. Houston Stevenson

Inventor:
Edward Kendall,
by N. C. Lombard
Atty.

UNITED STATES PATENT OFFICE.

EDWARD KENDALL, OF CAMBRIDGE, MASSACHUSETTS.

STEAM-BOILER.

SPECIFICATION forming part of Letters Patent No. 653,810, dated July 17, 1900.

Application filed April 24, 1900. Serial No. 14,076. (No model.)

*To all whom it may concern:*

Be it known that I, EDWARD KENDALL, of Cambridge, in the county of Middlesex and State of Massachusetts, have invented certain new and useful Improvements in Steam-Boilers, of which the following, taken in connection with the accompanying drawings, is a specification.

My invention relates to steam-boilers and to that particular class of such boilers as are termed "water-tube" boilers; and it consists in certain novel features of construction, arrangement, and combination of parts, which will be readily understood by reference to the description of the accompanying drawings, and to the claims hereto appended, and in which my invention is clearly pointed out.

Figure 1:
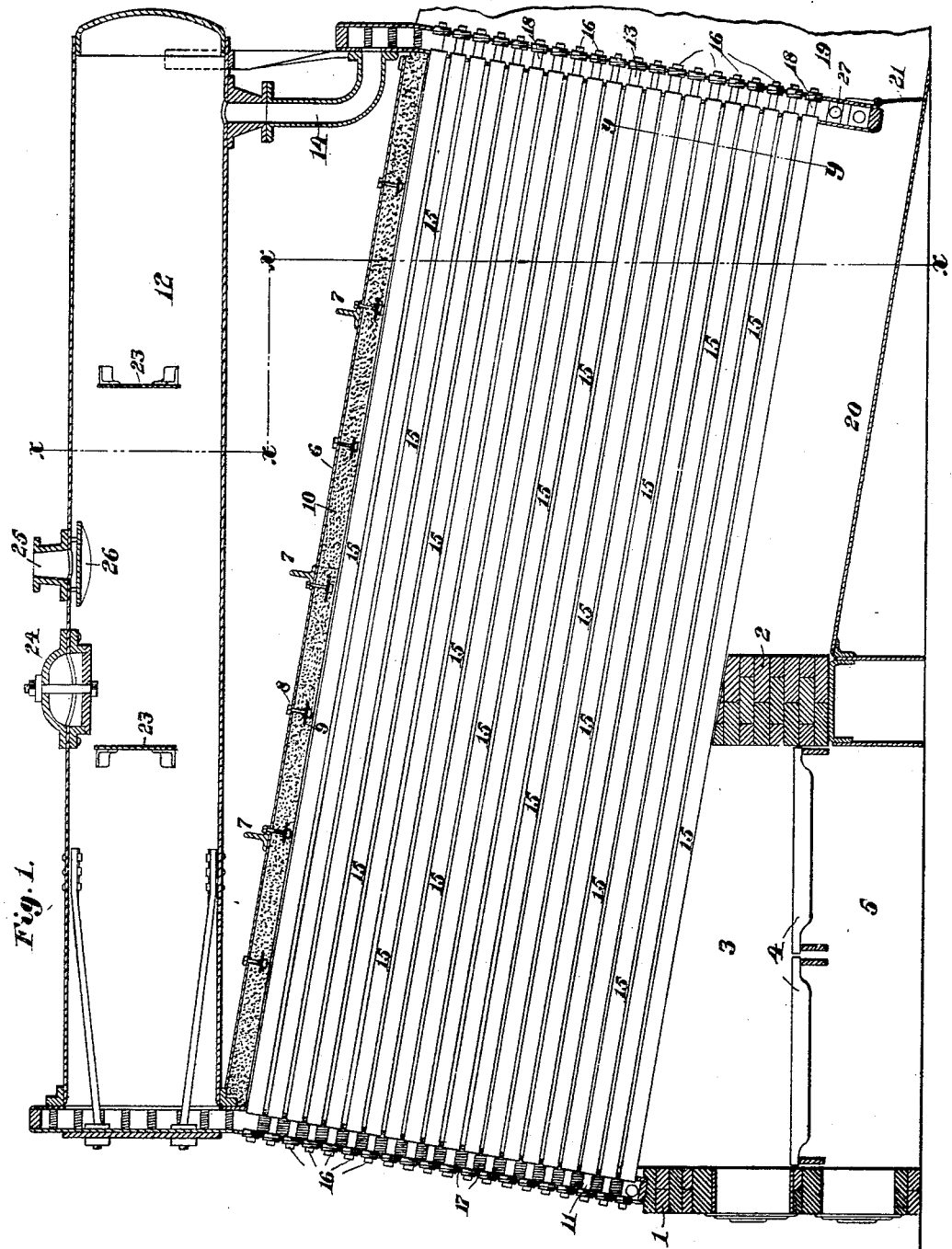
Figure 2:
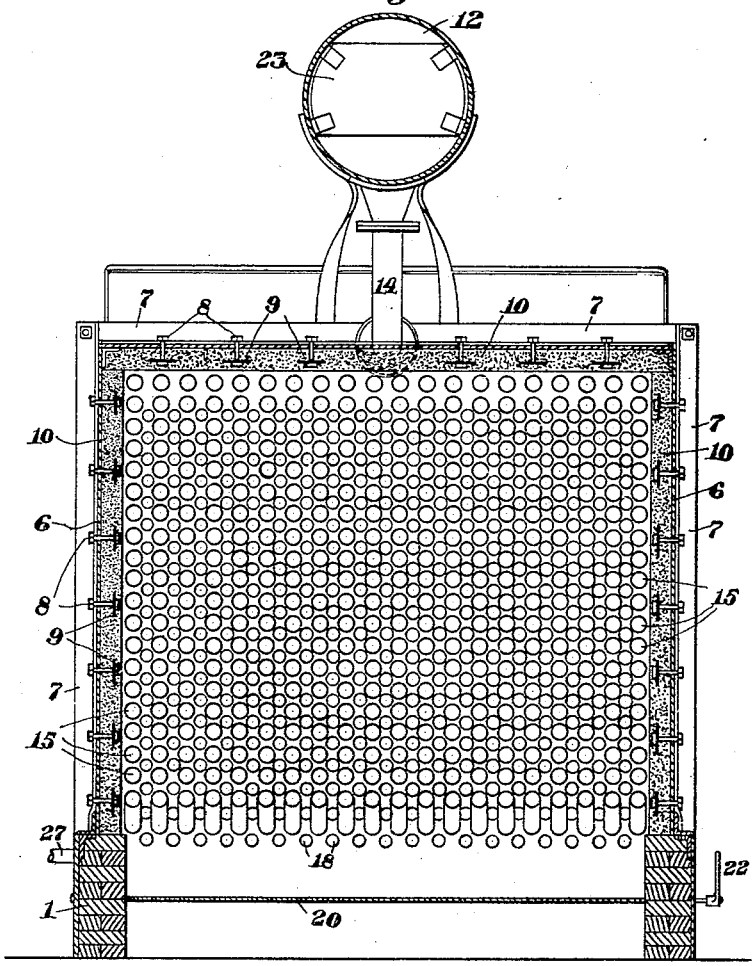
Figure 3:
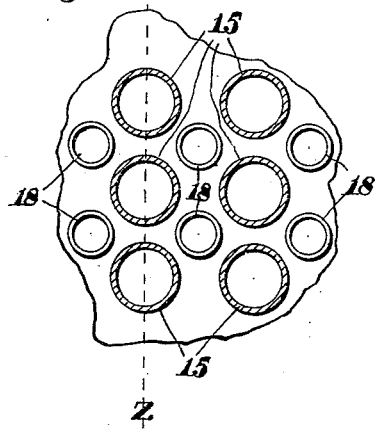
Figure 4:
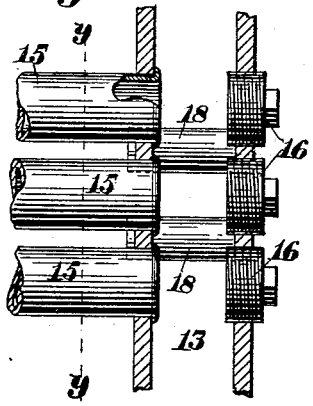
Figure 5:
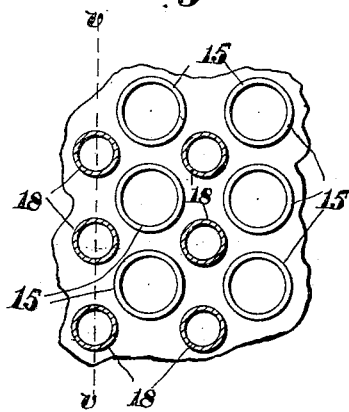
Figure 6:
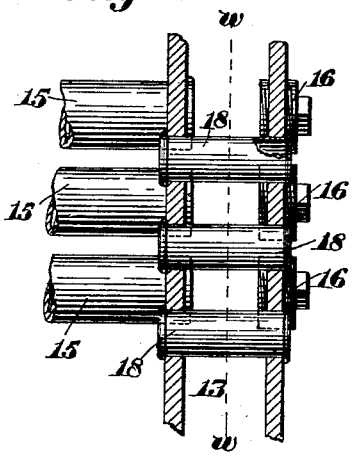

Figure 1 of the drawings is a central longitudinal and vertical section of a water-tube steam-boiler embodying my invention. Fig. 2 is a transverse vertical section on line $x$ $x$ on Fig. 1. Fig. 3 is a partial section on line $y$ $y$ on Fig. 4 looking toward the right of said figure and drawn to an enlarged scale. Fig. 4 is a section through the walls of the rear water-leg and a portion of one water-tube on line $z$ $z$ on Fig. 3. Fig. 5 is a partial sectional elevation, the cutting plane being on line $w$ $w$ on Fig. 6, looking toward the left of said figure. Fig. 6 is a section through the wall of the rear water-leg on line $v$ $v$ on Fig. 5 and showing a portion of the fire-tubes in elevation, with one partly in section.

In the drawings, 1 represents the brick setting; 2, the bridge-wall; 3, the fire-pot; 4, the grate; 5, the ash-pit, and 6 the metal shell, made rectangular in form and stiffened by the angle-irons 7, as shown in Figs. 1 and 2.

The shell 6 is inclined downward toward the rear, as shown in Fig. 1, and has secured to its inner surface by bolts 8, carrying washers 9 at their inner ends, a lining 10, of firebrick, fire-clay, or other similar protective material, said washers being embedded in said lining material, as shown in Figs. 1 and 2.

The front end of the boiler is provided with a water-leg 11, which extends above the top of the shell or casing 6 and communicates at its upper portion with the front end of the steam-drum 12, arranged centrally above the main body of the boiler in a horizontal position, as shown in Figs. 1 and 2. The rear end of the boiler is provided with the water-leg 13, which extends above the top of the shell 6 and is connected at its upper end with the interior of said steam-drum at its rear end by the pipe 14. A series of water-tubes 15 are set in the inner wall of each water-leg 11 and 13, so as to form a series of free communications between said water-legs. The outer plate of each water-leg 11 and 13 has formed therein a series of circular openings corresponding to the number of the water-tubes 15 and in axial line therewith, said openings having diameters slightly greater than the diameters of said tubes, so that said tubes may be passed through said outer plate and be set in the inner plate by means of expanding-tools operated through said openings. The openings in said outer plates are threaded and have screwed therein the screw-plugs 16, as shown in Fig. 1. The tubes 15 are arranged in vertical and horizontal rows, as shown in Fig. 2, and the two plates of the front water-leg 11 are connected together by stay-bolts 17, arranged in vertical and horizontal rows between the rows of tubes 15. The two plates forming the walls of the water-leg 13 are connected together by a corresponding number of tubular stays 18, set in vertical and horizontal rows alternating with the rows of water-tubes 15, as shown in Figs. 2, 3, 4, 5, and 6, said tubes 18 forming fire tubes or passages for the products of combustion from the interior of the combustion-chamber to the uptake or passage to the chimney, only a portion of one wall of which uptake is shown at 19 in Fig. 1. By this construction and arrangement of fire-tubes through the rear water-leg of the boiler the draft is so distributed as to cause the products of combustion to be much more evenly distributed among the water-tubes than heretofore, whereby a considerable increase in steam production is obtained. Another advantage of this arrangement of the water and fire tubes is that the exteriors of the water-tubes may be readily cleaned by a suitable tool inserted through said fire-tubes.

An inclined plate 20 extends from the bridge-wall to and is secured to or forms the bottom of the uptake, and 21 is a damper hinged to the bottom of the rear water-leg 13 and serves as a means of regulating the amount of draft through the fire-tubes 18 by moving it more or less about its pivotal connection to said water-leg by means of the lever 22. A pair of baffle-plates 23 extend transversely across the drum 12 at about equal distances from each end of said drum and from each other, said plates having a width less than the diameter of said drum and so arranged therein as to leave a space between its upper edge and the inner surface of said drum and a similar space between its lower edge and the inner surface of the bottom of said drum, as shown in Figs. 1 and 2.

The drum 12 is provided with a manhole 24 of ordinary construction, with a steam-discharge nozzle 25, and with the curved disk 26, suspended a short distance below said discharge-nozzle for the purpose of preventing priming or carrying of the water over into the engine with the steam.

The feed-water is introduced into the rear water-leg through the pipe 27. (See Figs. 1 and 2.)

The operation of my invention will be readily understood from the foregoing without further explanation here.

What I claim as new, and desire to secure by Letters Patent of the United States, is—

1. In a water-tube steam-boiler the combination of a shell or casing having its top inclined downward toward its rear and having a water-leg at its front and rear ends; a series of inclined water-tubes arranged in vertical and horizontal rows, set in tube-sheets forming the inner walls of said water-legs; a corresponding series of openings in the outer walls of said water-legs having diameters at least equal to the exterior diameters of said water-tubes, and in axial line with said water-tubes; a series of removable screw-plugs closing said openings; a horizontal cylindrical drum located above said shell or casing and communicating at its front end with the front water-leg; and a pipe connecting the interior of the rear end of said drum with the interior of the rear water-leg.

2. The combination, in a steam-boiler of a shell or casing made rectangular in cross-section and inclined downward toward its rear end and provided with a water-leg at its front, and at its rear end; a series of inclined water-tubes arranged in vertical and horizontal rows, and set in tube-sheets which form the inner walls of said water-legs; a corresponding series of openings in the outer walls of each water-leg, having diameters at least equal to the exterior diameters of said water-tubes and in axial line therewith; a series of screw-plug caps closing said openings; a series of fire-tubes firmly set in the inner and outer walls of said rear water-leg, and extending only from the inner face of the inner wall to the outer face of the outer wall of said rear water-leg; said fire-tubes being arranged in vertical and horizontal rows alternating with the vertical and horizontal rows of said water-tubes.

3. The combination in a steam-boiler, of a metallic shell or casing the crown-sheet of which is inclined downward toward its rear end and having water-legs at its front and rear ends, both side walls of each of which have formed therein a series of openings arranged in vertical and horizontal rows and in axial line with each other; a corresponding series of inclined water-tubes set in the inner walls of said water-legs; a corresponding series of removable screw-plugs closing the openings in the outer wall of each water-leg; a series of short fire-tubes extending only through the rear water-leg and firmly set in the inner and outer walls thereof, and arranged in rows alternating with the vertical and horizontal rows of said water-tubes; a passage beneath said rear water-leg; and a damper constructed and arranged to close or open said passage.

4. The combination in a steam-boiler of a shell or casing the crown-sheet of which is inclined downward toward its rear end, and having water-legs at its front and rear ends both side walls of which legs have formed therein a series of openings or perforations arranged in vertical and horizontal rows, and in axial line with each other; a corresponding series of inclined water-tubes set in the openings in the inner or tube sheets of said water-legs; a cylindrical drum arranged in a horizontal position above said casing, with its axis coinciding approximately to the normal water-line of the boiler; and a plurality of baffle-plates extending transversely across said drum but of less height than the diameter of said drum, as shown.

In testimony whereof I have signed my name to this specification, in the presence of two subscribing witnesses, on this 21st day of April, A. D. 1900.

EDWARD KENDALL.

Witnesses:
N. C. LOMBARD,
J. HOUSTON STEVENSON.